United States Patent
Woodland et al.

(10) Patent No.: US 9,664,217 B2
(45) Date of Patent: May 30, 2017

(54) FOLDABLE CLIP

(71) Applicant: SUKUP MANUFACTURING CO., Sheffield, IA (US)

(72) Inventors: Jeremy Ryan Woodland, Ventura, IA (US); James Richard Shipley, Mason City, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 0 days.

(21) Appl. No.: 14/299,398

(22) Filed: Jun. 9, 2014

(65) Prior Publication Data

US 2015/0040357 A1   Feb. 12, 2015

Related U.S. Application Data

(60) Provisional application No. 61/862,589, filed on Aug. 6, 2013.

(51) Int. Cl.
*F16B 2/26* (2006.01)

(52) U.S. Cl.
CPC ........... *F16B 2/26* (2013.01); *Y10T 24/44923* (2015.01)

(58) Field of Classification Search
CPC ... E01F 1/00; E04D 3/00; E04D 15/00; E04D 1/12; E04D 13/10; E04B 1/68
USPC ................................................ 24/563; 52/24
See application file for complete search history.

(56) References Cited

U.S. PATENT DOCUMENTS

| | | | | | |
|---|---|---|---|---|---|
| 1,222,953 | A | * | 4/1917 | Histand | .............................. 52/24 |
| 3,296,751 | A | * | 1/1967 | Heirich | ................... E04F 10/08 |
| | | | | | 52/38 |
| 3,302,357 | A | * | 2/1967 | Scott | ....................... E04D 3/365 |
| | | | | | 52/520 |
| 4,400,922 | A | * | 8/1983 | Boyer | ................... E04D 3/3607 |
| | | | | | 52/394 |
| 4,466,224 | A | * | 8/1984 | Hague | ................... E04D 3/3602 |
| | | | | | 52/404.2 |
| 4,467,582 | A | * | 8/1984 | Hague | ..................... E04D 3/363 |
| | | | | | 52/419 |
| 4,555,879 | A | * | 12/1985 | Cheater | ................. E04D 12/006 |
| | | | | | 52/90.1 |
| 6,609,344 | B2 | * | 8/2003 | Saldana | .......................... 52/696 |
| 6,751,911 | B1 | * | 6/2004 | Gates | .................... E04D 13/158 |
| | | | | | 52/58 |
| 7,607,269 | B2 | * | 10/2009 | Klein | .............................. 52/281 |
| 7,866,120 | B2 | * | 1/2011 | Prenn | .................... E01F 15/141 |
| | | | | | 52/169.13 |
| 8,555,560 | B2 | * | 10/2013 | Rasmussen | ........... E04D 13/158 |
| | | | | | 52/287.1 |

* cited by examiner

*Primary Examiner* — Robert J Sandy
*Assistant Examiner* — Rowland Do
(74) *Attorney, Agent, or Firm* — Zarley Law Firm, P.L.C.

(57) ABSTRACT

A clip for attaching sheeting and trim to a grain bin includes a plate having a strip that is foldable over the plate along a fold line. A pair of slots are positioned at opposite ends between the plate and the strip and extend inwardly from the ends. The strip has four corners that alternate from a 90° corner to a rounded corner.

6 Claims, 3 Drawing Sheets

FOLDABLE CLIP

CROSS REFERENCE TO RELATED APPLICATION

This application claims the benefit of U.S. Provisional Application No. 61/862,589 filed Aug. 6, 2013.

BACKGROUND OF THE INVENTION

This invention is directed to a clip and more particularly to a non-structural clip for attaching sheeting and trim.

Presently, when building a steel structure a builder follows a scheduled sequence of erection. First, sidewall panels are installed, then the soffit followed by soffit trim and eave trim, and finally roof panels are installed. To deviate from this sequence by installing roof panels prior to wall and soffit panels, builders are using more eave trim parts to maintain the two piece eave and soffit trims. Because of the additional parts, additional time is needed to complete the installation. Alternatively, builders use single piece eave trims that "oil can" but require extra effort to produce a quality aesthetic for the eave of the buildings. Therefore, a need exists in the art for a device that addresses these deficiencies.

An objective of the present invention is to provide a clip having few parts that is installed without the use of tools and fasteners.

A further objective of the present invention is to provide a clip that reduces the time of installation.

A still further objective is to provide a clip that requires little effort to produce a quality aesthetic for the eave of a building.

These and other objectives will be apparent to one of the ordinary skill in the art based upon the following written description, drawings, and claims.

SUMMARY OF THE INVENTION

A clip for attaching sheeting and trim to a grain bin includes a plate having a strip that is foldable over the plate along a fold line. A pair of slots are positioned at opposite ends between the plate and the strip and extend inwardly from the ends. The strip has four corners that alternate from a 90° corner to a rounded corner.

DETAILED DESCRIPTION OF THE PREFERRED EMBODIMENTS

Figure 1:
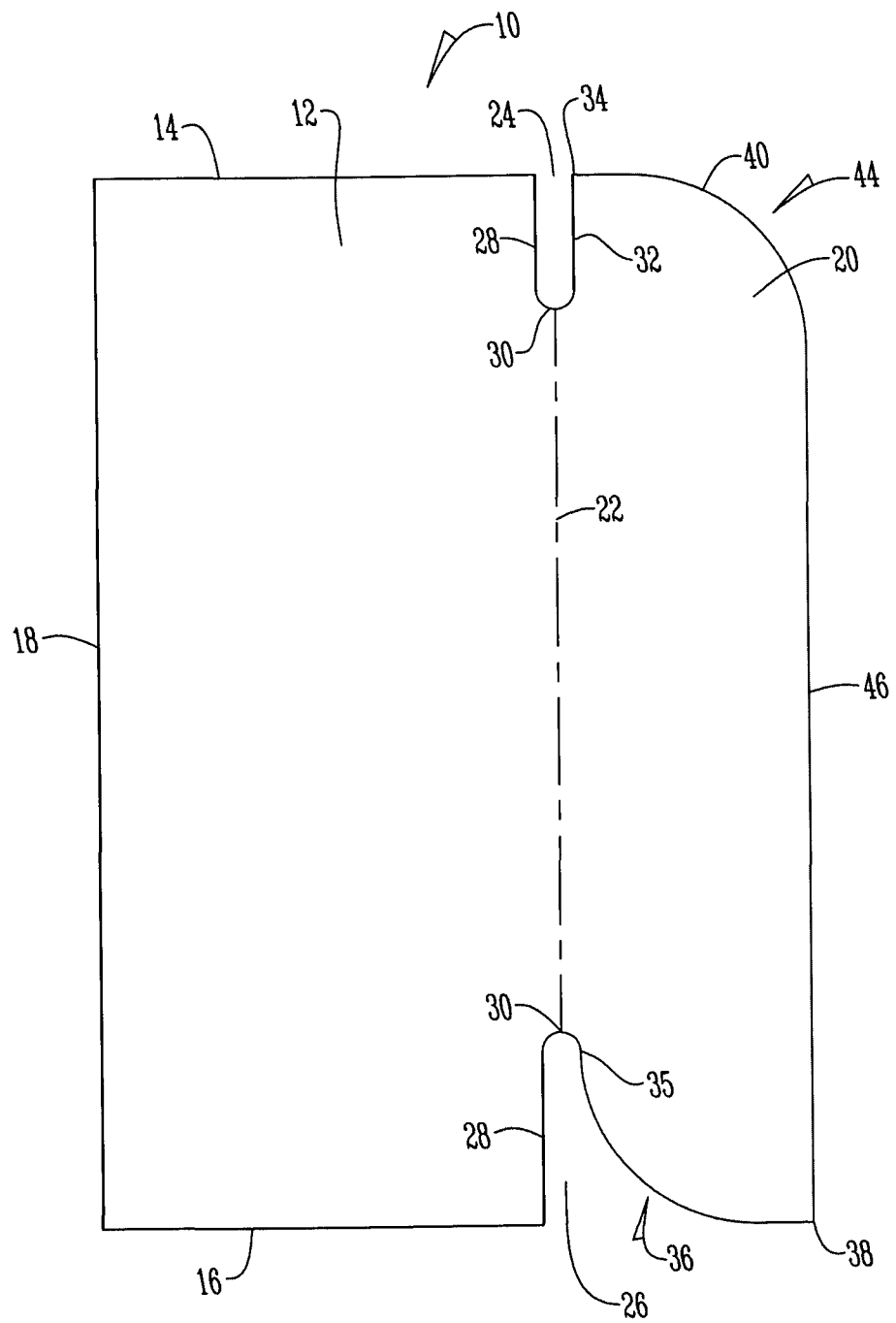
FIG. 1 is a top plan view of a clip.
Figure 2:
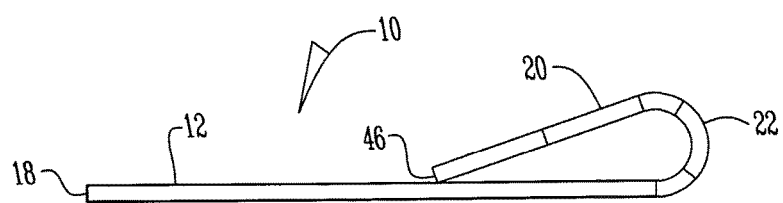
FIG. 2 is a side view of a clip.
Figure 3:
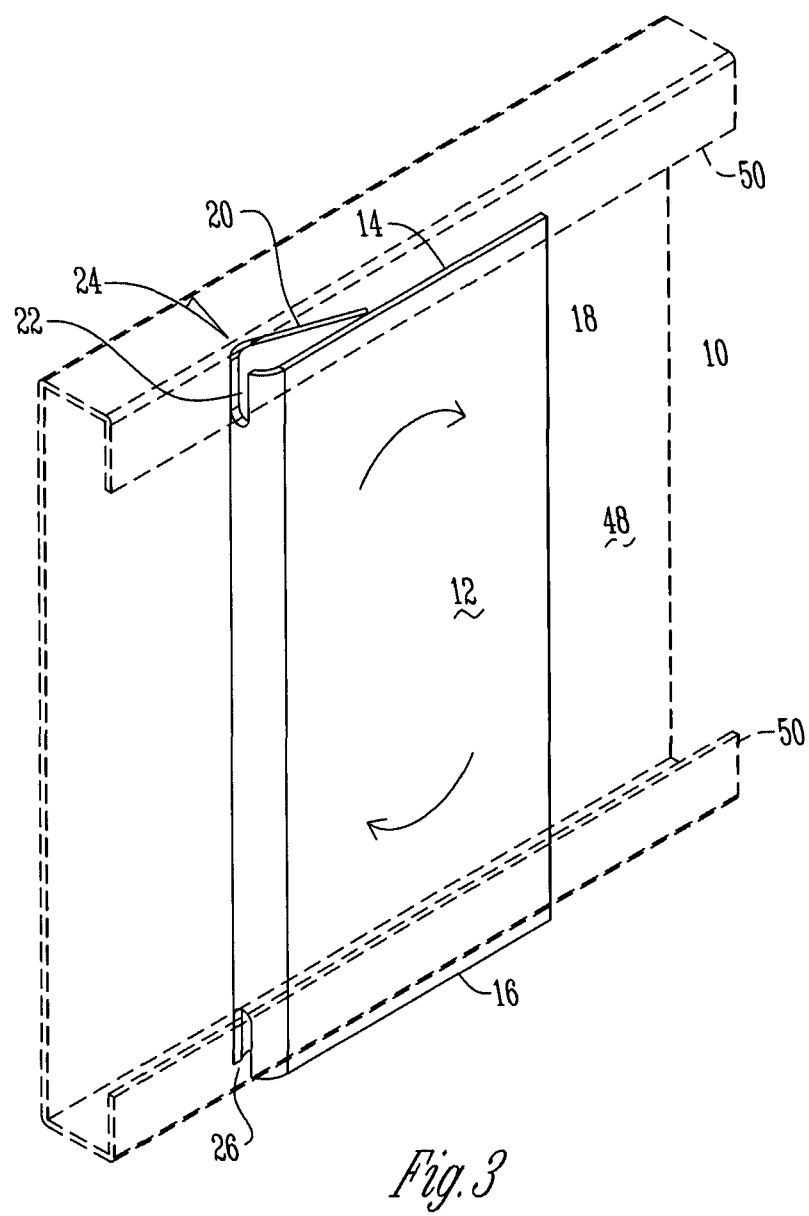
FIG. 3 is a perspective view of a clip with an eave.

Referring to the Figures, a clip 10 includes a plate 12 cut on a laser that has a first end 14, a second end 16, a side edge 18 and a foldable strip or flap 20 opposite side edge 18. The foldable strip 20 is capable of being folded back toward edge 18 along a fold line 22.

The fold line 22 is defined by the center of a first slot 24 and a second 26 slot which are aligned in spaced relation and extend inwardly from first end 14 and second end 16. Slots 24 and 26 both have a linear portion 28 that extends inwardly from ends 14 and 16 and terminate in an arcuate portion 30. The first slot 24 has a second linear portion 32 that extends from the arcuate portion 30 to a first corner 34 of the foldable strip 20. The second slot 26 has a second arcuate section 35 that forms a second rounded corner 36 of the strip 20 and extends from the arcuate portion 30 and terminates at a third corner 38. First corner 34 extends 90° from second linear section 32 to an arcuate portion 40 that forms a fourth corner 44 on the strip 20. The third corner 38 extends 90° from the second arcuate section 35 to the fourth corner 44 to form a side edge 46.

The clip 10 is non-structural and is used for the attachment of sheeting and trim. In operation, strip 20 is folded over plate 12 along the fold line 22. The clip 10 is positioned parallel with an eave 48 and then twisted to a transverse position in relation to the eave 48. As the clip 10 is twisted or rotated, and outwardly extending flanges 50 on the eave 48 are received in the first slot 24 and the second slot 26 between plate 12 and strip 20. The 90° first corner 34 and 90° third corner 38 prevents over rotation and twisting out of connection of the clip 10 in relation to the eave 48. Tools are unnecessary because of the pressure created when the clip squeezes and/or pinches the material to which the clip is being attached. For example, pressure is applied by strip 20 to 50 at point 46.

Accordingly, a clip has been disclosed that, at the very least, meets all the stated objectives.

What is claimed is:

1. A clip, comprising:
a plate having a first end, a second end, and a side edge;
a strip foldably attached to the plate along a fold line and having two rounded corners; and
a pair of slots defining the center of the fold line, configured to receive an eave, further comprising a linear portion that terminates in an arcuate portion; and
wherein a second slot of the pair of slots has a second arcuate section that forms a second rounded corner of the strip and extends from the arcuate portion of the second slot and terminates at a third corner of the strip.

2. The clip of claim 1 wherein the first and the second slots each has a linear portion that terminates in an arcuate portion.

3. The clip of claim 1 wherein the first slot has a second linear portion that extends from the arcuate portion of the first slot to a first corner of the foldable strip.

4. The clip of claim 1 wherein the first end and second end are on opposing ends of the strip with a side edge therebetween, such that when the strip is in a folded position the side edge is folded towards the plate.

5. A clip, comprising:
a plate having a first end, a second end, and a side edge;
a strip foldably attached to the plate along a fold line;
a first slot and a second slot in aligned spaced relation along the fold line and extending inwardly from the first end and the second end wherein the first and the second slots each have a linear portion that terminates in an arcuate portion and the first slot has a second linear portion that extends from the arcuate portion of the first slot to a first corner of the foldable strip; and
the strip has a first arcuate portion that extends away from one of the first and second slots to form a rounded corner of the strip and a second arcuate portion extends away from the other of the first and second slots to form another rounded corner of the strip.

6. A clip, comprising:
a plate having a first end, a second end, and a side edge;
a strip foldably attached to the plate along a fold line having two rounded corners; and
a first and a second slot in aligned spaced relation along the fold line and extending inwardly from the first end and the second end;

wherein the first and the second slots are configured to receive an eave, the first and second slots each have a linear portion that terminates in an arcuate portion, and the second slot has a second arcuate section that forms a second rounded corner of the strip and extends from the arcuate portion of the second slot and terminates at a third corner of the strip.

* * * * *